No. 847,580. PATENTED MAR. 19, 1907.
H. T. JACOBSEN.
ADJUSTABLE DROP LIGHT.
APPLICATION FILED MAY 21, 1906.
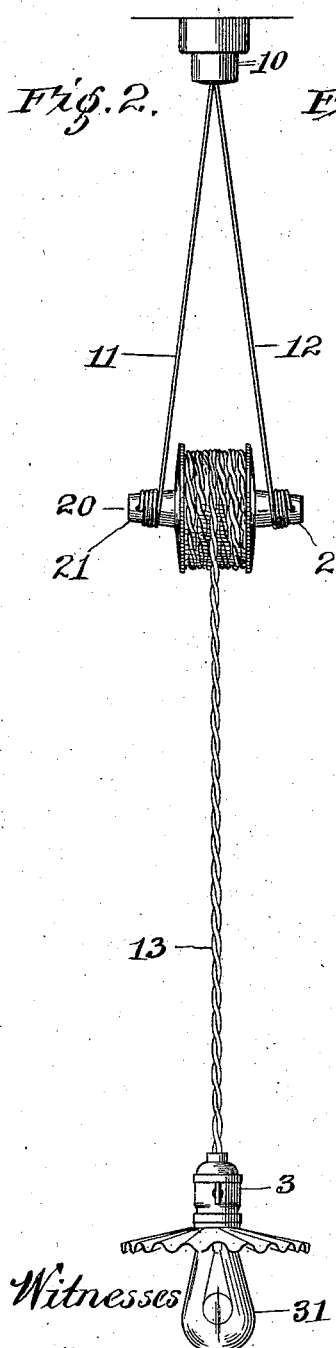
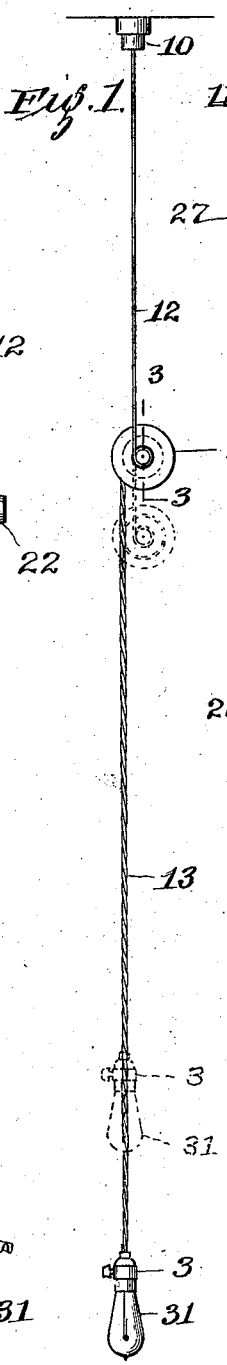
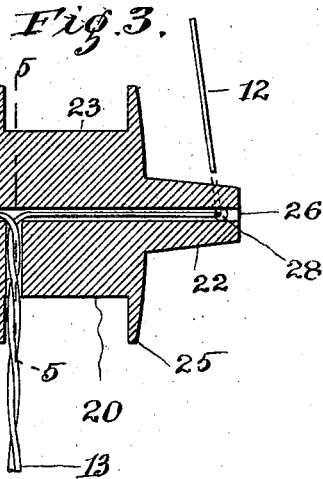
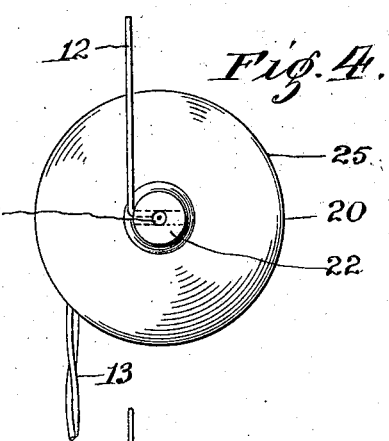
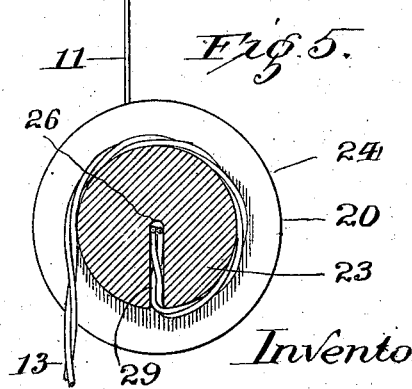
Witnesses
Wm. P. Bond
G. E. Anderson
Inventor:
Henrik Trygve Jacobsen,
by Charles O. Shurvey,
Atty.

UNITED STATES PATENT OFFICE.

HENRIK TRYGVE JACOBSEN, OF CHICAGO, ILLINOIS.

ADJUSTABLE DROP-LIGHT.

No. 847,580.      Specification of Letters Patent.      Patented March 19, 1907.

Application filed May 21, 1906. Serial No. 317,875.

*To all whom it may concern:*

Be it known that I, HENRIK TRYGVE JACOBSEN, a subject of the King of Norway, a resident of Chicago, in the county of Cook and State of Illinois, have invented certain new and useful Improvements in Adjustable Drop-Lights, of which the following is a full, clear, and exact description.

My invention relates to certain new and useful improvements in adjustable droplights; and its object is to produce a device of this class which shall be simple, cheap in construction, and effective in operation. In my device the use of springs, supplemental counterweights, and the like have been dispensed with, and consequently liability to get out of repair has been considerably lessened.

The invention consists in certain novel features of construction, a description of which will be found in the following specification and the essential features definitely pointed out in the claim.

The invention is clearly illustrated in the drawing accompanying this specification, in which—

Figure 1 is a side elevation of an apparatus embodying the preferred form of my invention. Fig. 2 is a front view on a somewhat larger scale. Fig. 3 is a detail diametrical section through the winding-spool, taken in the line 3 3, Fig. 1, and showing the manner of threading the cord through the spool. Fig. 4 is an end view of the spool, showing a fragment of the conducting-cord; and Fig. 5 is a vertical cross-section taken in the line 5 5 of Fig. 3.

In designing my device I have aimed to reduce it to its simplest form and interpose in the conducting-cord of the ordinary droplight a spool which contains drums of different diameter upon which the conducting-cord is wound in a particular manner, so that in a given revolution of the spool one part of the cord will be wound up on the spool faster than the other part is unwound therefrom. Thus if the cord is fixed to a suitable support and wound upon the spool in the proper manner and the free end connected to a suitable lamp or other like object rotation of the spool may be effected by pulling down upon the lamp or by raising it to a position nearer the spool. If that part of the cord which extends from the lamp be wound around the larger of the drums and the lamp lowered sufficiently to make one complete rotation of the spool, one turn of the cord about the spool will be unwound therefrom. One turn of the cord extending from the support will consequently be wound upon the smaller spool; but on account of the difference in size more cord will be unwound from the spool than is rewound, and the distance between the support and lamp will be increased. The reverse action is made to take place when the lamp is brought nearer the support. I have aimed to make the weight of the spool in such proportion to the weight of the ordinary incandescent light that one will practically counterbalance the other, so that when the lamp is adjusted to the desired position it will remain in such position.

I will now proceed with a more detailed description of the device as it is shown in the drawing.

10 represents an ordinary plug from which extend the two strands 11 and 12 of the conducting-cord 13. The two strands are untwisted between the plug 10 and their connection with the spool 20 and pass through the spool and on to the lamp-socket 3 of the lamp 31. The spool 20 has two laterally-projecting drums 21 22, upon which that portion of the strands 11 12 adjacent to the spool is wound and unwound in the operation of the device. The spool 20 has also a central drum 23, whose diameter is considerably greater than that of the drums 21 22, and the three drums are separated by flanges 24 and 25, which confine the cords upon their proper drums. A passage 26 extends through the spool from end to end, and two holes 27 28 extend radially through the drums 21 22 at points near their outer ends. A third hole 29 connects the central passage 26 with the periphery of the central drum 23. The cord 13 is preferably left in its twisted condition from the point where it emerges from the spool 20 to the lamp-socket 3 at its lower end.

In threading the cord through the spool the two untwisted ends are first passed in through the hole 29, then passed in opposite directions out through the holes 27 28, and connected up with the plug 10. The twisted end may then be partially wound upon the central spool and attached to the lamp-socket. By reason of the fact that the two strands 11 12 extend to the outer ends of the spool the latter is maintained in a position at right angles to a line extending from the plug to the lamp, so that in operating the de vice to raise or lower the lamp the winding or unwinding of the cord upon the drum is insured.

If the plug be secured in place and the lamp left free to hang, it will be found that it will stay at whatever height it is placed, the weight of the spool being in such proportion to the weight of the lamp that the two will be practically counterbalanced, although no particular pains are necessary to make the proportions exact, as the friction of the cord upon the spool assists materially in preventing accidental movement of the lamp with respect to the spool. When the lamp is lifted to raise its position, the spool falls by gravity and unwinds a portion of the strands 11 12, but rewinds a greater amount of the cord which extends to the lamp, so that the distance between the plug and lamp is decreased.

I claim as new and desire to secure by Letters Patent—

In a device of the class described, the combination of a suitably-supported conducting-cord the two strands of which are untwisted throughout a portion of its length, a pair of drums about which said untwisted portions are wound, a larger centrally-located drum upon which the twisted portion of the cord may be wound, said drums having internal passages through which the cord can pass from the smaller drums to the larger one, flanges between the large and small drums and a lamp connected to and supported by the conducting-cord.

HENRIK TRYGVE JACOBSEN.

Witnesses:
CHARLES O. SHERVEY,
CLARA L. MARTIN.